(12) United States Patent
Groz

(10) Patent No.: US 8,473,383 B2
(45) Date of Patent: Jun. 25, 2013

(54) DIVERSATIVES

(76) Inventor: Marc Michael Groz, Stamford, CT (US)

( * ) Notice: Subject to any disclaimer, the term of this patent is extended or adjusted under 35 U.S.C. 154(b) by 783 days.

(21) Appl. No.: 11/367,838

(22) Filed: Mar. 4, 2006

(65) Prior Publication Data

US 2006/0200252 A1    Sep. 7, 2006

Related U.S. Application Data

(63) Continuation-in-part of application No. 10/733,482, filed on Dec. 11, 2003, now abandoned, which is a continuation-in-part of application No. 10/043,071, filed on Jan. 8, 2002.

(60) Provisional application No. 60/260,546, filed on Jan. 8, 2001, provisional application No. 60/260,547, filed on Jan. 8, 2001, provisional application No. 60/432,851, filed on Dec. 12, 2002, provisional application No. 60/659,035, filed on Mar. 5, 2005, provisional application No. 60/669,607, filed on Apr. 9, 2005, provisional application No. 60/698,216, filed on Jul. 11, 2005.

(51) Int. Cl.
*G06Q 40/00* (2006.01)

(52) U.S. Cl.
USPC .............................. 705/35; 705/37; 705/36 R

(58) Field of Classification Search
USPC .................... 705/35, 36, 37, 7, 36 R
See application file for complete search history.

(56) References Cited

U.S. PATENT DOCUMENTS

| | | | | |
|---|---|---|---|---|
| 6,484,152 | B1 * | 11/2002 | Robinson | 705/36 R |
| 7,565,316 | B1 * | 7/2009 | Amin et al. | 705/37 |
| 8,121,925 | B1 * | 2/2012 | Ives, Jr. | 705/36 R |
| 2003/0055776 | A1 * | 3/2003 | Samuelson | 705/37 |
| 2004/0064394 | A1 * | 4/2004 | Wallman | 705/36 |
| 2004/0107157 | A1 * | 6/2004 | Bleunven et al. | 705/37 |

OTHER PUBLICATIONS

Nicholas Chan et al, "Systemic Risk and Hedge Funds", NBER working paper 11200, Feb. 22, 2005.
John Von Neumann et al, "Theory of Games and Economic Behavior", Princeton University Press, 1953.
Elizabeth Ungar, "Swap Literacy", Bloomberg Press, 1996.

* cited by examiner

*Primary Examiner* — Ojo O Oyebisi
(74) *Attorney, Agent, or Firm* — Amster, Rothstein & Ebenstein, LLP

(57) ABSTRACT

A method and system is disclosed for creating and managing Diversative Financial Instruments. Diversative Financial Instruments are designed to increase the risk-adjusted return of investment portfolios and other collections of assets and/or liabilities. The method and system also addresses the problem of the Regime Switching Effect, which tends to destroy the benefits of investment diversification when it is most needed, i.e., during a financial crisis. By creating Diversative Financial Instruments that are designed to counteract the Regime Switching Effect, diversification benefits may be tailored to the requirements of investors.

1 Claim, No Drawings

DIVERSATIVES

CROSS REFERENCE TO RELATED APPLICATIONS

This application is a continuation in part and claims benefit of U.S. Nonprovisional Patent Application Ser. No. 10/043,071, by Marc M. Groz, entitled "Method and System for increasing expected rate of return and maximum payout in a game of one or more players", filed on Jan. 8, 2002, which is incorporated herein by reference. Patent application Ser. No 10/043,071, in turn, claims priority to U.S. Provisional Patent Application. 60/260,546 by Marc M. Groz, entitled "Securities Collateralized by Outcome of Random Events", filed On Jan. 8, 2001. Patent application Ser. No. 10/043,071 also, in turn, claims priority to U.S. Provisional Patent Application. 60/260,547 by Marc M. Groz, entitled "Enhanced Gaming System", filed on Jan. 8, 2001.

This application is a continuation in part and claims benefit of U.S. Nonprovisional patent application Ser. No. 10/733,482, by Marc M. Groz, entitled "Programmable Financial Instruments", filed on Dec. 11, 2003 now abandoned, which is incorporated herein by reference. Patent application Ser. No. 10/733,482, in turn, claims priority to U.S. Provisional Patent Application 60/432,851 by Marc M. Groz, entitled "Programmable Financial Instruments", filed on Dec. 12, 2002.

This application claims benefit of U.S. Provisional Patent Application 60/659,035 by Marc M. Groz, entitled "Financial instruments with specified correlation characteristics", filed on Mar. 5, 2005, which is incorporated herein by reference.

This application claims benefit of U.S. Provisional Patent Application 60/669,607 by Marc M. Groz, entitled "Diversatives ", filed on Apr. 9, 2005, which is incorporated herein by reference.

This application claims benefit of U.S. Provisional Patent Application 60/698,216 by Marc M. Groz, entitled "Method and system for producing uncorrelated returns", filed on Jul. 11, 2005, which is incorporated herein by reference.

BACKGROUND OF THE INVENTION

One of the principal reasons for investing in alternative assets is the expectation of "uncorrelated returns", i.e., returns that are at most weakly correlated with traditional asset classes such as stocks and bonds. Hedge funds, private equity, real estate, and other vehicles have been offered as providers of uncorrelated returns. Many of these investments do offer uncorrelated returns much of the time. Nonetheless, a significant unsolved problem remains: the lack of correlation tends to break down when it is most needed, i.e., in times of market crisis.

For example, a Fund of Hedge Funds ("FoHF") may see its constituent funds' correlations to standard benchmarks jump from around zero to around one. Worse, the beta of these funds (whose financial and operational leverage may be significant) can increase even more, leading to losses that are a multiple of what is happening to the benchmarks. And we have not yet considered the impact of borrowing at the FoHF level.

This problem, which we will refer to as the "Regime Switching Effect", threatens to negate one of the major reasons for investing in alternatives. (The other reason, the desire to capture alpha, is also affected by the Regime Switching Effect.)

U.S. patent application Ser. No. 10/043,071, filed Jan. 8, 2002 discloses a method and system for creating financial instruments ("SCOREs") whose future cash flows are at least partially determined by an event or events associated with playing of one or more games or in relationship to an event or events that can be modeled in game-theoretic terms.

For example, a SCORE bond could have weekly interest payments that are linked to whether or not a particular state lottery has a grand-prize winner that week. If there is a winner, bondholders forgo one or more interest payments according to a predefined schedule. When there is no winner, bondholders collect interest payments large enough to compensate for the risk of periodic missed payments.

An alternative mechanism would be to eliminate the bond entirely and to create a SCORE derivatives contract (funded or unfunded) with a bi-directional cash flow structure. In this instance, an investor or investors would receive periodic payments from a counterparty in exchange for guaranteeing a prize payment. In a preferred embodiment, the investor(s) would receive many small payments in exchange for making an occasional large payment. They would provide game operators (e.g. casino or state lottery) the ability to offer much larger prizes by accepting regular premia from the game operators.

SCORES are a new class of financial instruments that offer a means for producing sustainable uncorrelated returns. "SCORE" is an acronym for "Securities Collateralized by the Outcome of Random Events." SCOREs may be implemented in a variety of ways, including as fixed income securities, equity securities, and OTC derivatives subject to ISDA-like rules.

Unlike existing alternative assets, SCOREs derive a portion of their returns from a random process associated with the playing of a game such as the outcome of a state lottery. For example, a SCOREs contract may be written to allow a state or national lottery to offer a super-grand prize, providing a powerful inducement for players to buy tickets.

Given that their returns are at least partially independent of market forces, SCOREs may be used to provide portfolio diversification even when the Regime Switching Effect destabilizes other alternative assets.

Detailed Examples of SCOREs in operation:

EXAMPLE 1

Large State Lottery

State Lottery "A" currently sells $1,000,000,000 worth of tickets over two years.
$500,000,000 gets returned to players as prizes. Over the course of two years, $300,000,000 is paid out in 50 grand prizes ranging from $2,000,000 to $10,000,000 with an average value of $6,000,000. The remaining $200,000,000 is paid out in small prizes.
$400,000,000 goes into the state's education fund.
$100,000,000 covers costs.
The state has severe budget difficulties and needs to double its lottery-based education funding. It decides to do this by embedding a super-grand-prize, which pays out on average once in 100 weekly drawings, into its existing lottery. To accomplish this, "A" enters into a SCOREs contract with a counterparty consisting of a group of financial institutions and/or institutional investors. "A" pays a premium of $1,000,000 per week to the counterparty. The counterparty guarantees a super-grand prize with an NPV of $40,000,000, expecting to pay it once in two years. The state advertises a $100,000,000 (nominal) super-grand prize, enabling it to double ticket sales over two years.

Result: State Lottery "A+SCOREs" sells $2,000,000,000 worth of tickets over two years.

$940,000,000 gets returned to players as prizes. Over the course of two years, $540,000,000 of this prize money is paid out in 90 grand prizes ranging from $2,000,000 to $10,000,000 with an average value of $6,000,000. $360,000,000 is paid out in small prizes. A single super grand prize of $40,000,000 is paid.

$800,000,000 goes into the state's education fund.

$300,000,000 covers costs, including $100,000,000 paid to the counterparty.

Analysis

Lottery doubles its take, while increasing its net cost by 3 cents per dollar ticket.

Players win nearly twice as many prizes, with a super-grand prize as inducement to play.

Investors earn an expected P&L of $60,000,000 over two years. In return, investors bear the risk of loss in 8% of two-year intervals. Evaluated against a nominal capital reserve of $100,000,000, expected IRR is approximately 30%. See Table One on page TK.

EXAMPLE 2

National or Multi-State Lottery

National or Multi-State Lottery "M" currently sells $10,000,000,000 worth of tickets over two years.

$5,000,000,000 gets returned to players as prizes. Over the course of two years, 3,000,000,000 is paid out in 50 grand prizes ranging from $20,000,000 to $100,000,000 with an average value of $60,000,000. The remaining $2,000,000,000 is paid out in small prizes.

$4,000,000,000 goes into the national or multi-state fund.

$1,000,000,000 covers costs.

The government entity has severe budget difficulties and needs to double its lottery-based funding. It decides to do this by embedding a super-grand-prize, which pays out on average once in 100 weekly drawings, into its existing lottery. To accomplish this, "M" enters into a SCOREs contract with a counterparty consisting of a group of financial institutions and/or institutional investors. "M" pays a premium of $10,000,000 per week to the counterparty. The counterparty guarantees a super-grand prize with an NPV of $400,000,000, expecting to pay it once in two years. The governmental entity advertises a $1,000,000,000 (nominal) super-grand prize, enabling it to double ticket sales over two years.

Result: Lottery "M+SCOREs" sells $20,000,000,000 worth of tickets over two years.

$9,400,000,000 gets returned to players as prizes. Over the course of two years, $5,400,000,000 of this prize money is paid out in 90 grand prizes ranging from $20,000,000 to $100,000,000 with an average value of $60,000,000. $3,600,000,000 is paid out in small prizes. A single super grand prize of $400,000,000 is paid.

$8,000,000,000 goes into the government fund.

$3,000,000,000 covers costs, including $1,000,000,000 paid to the counterparty.

Analysis

Lottery doubles its take, while increasing its net cost by 3 cents per dollar ticket.

Players win nearly twice as many prizes, with a super-grand prize as inducement to play.

Investors earn an expected P&L of $600,000,000 over two years. In return, investors bear the risk of loss in 8% of two-year intervals. Evaluated against a nominal capital reserve of $1,000,000,000, expected IRR is approximately 30%. See Table One on page TK.

A Matter of Scale

Comparing Examples 1 & 2, it is obvious that the latter is equivalent to the former with a tenfold increase in the numbers. An interesting question arises: how scaleable are SCOREs? How will ticket sales—the source of revenue for government lottery and institutional prize guarantor—respond to larger and larger prizes? While no one can know the answer with certainty, it is a given of the lottery industry that big prizes=big sales. The effect is non-linear, i.e., bigger prizes are more profitable than smaller prizes. Hence, if anything, billion-dollar lotteries, properly organized and marketed to the public, should sell more than enough tickets to justify the effort. Aside from creating a group of new centimillionaires, SCOREs would deliver much needed diversification to portfolios currently at risk from the Regime Switching Effect.

Assuming that SCOREs are worthwhile investments, how large a market could be created for them? What of the downside from promoting gambling?

Taking the second question first, it is important to note that SCOREs were invented in conjunction with a new type of lottery called Nu Lots™. Nu Lots converts standard lotteries (and other games) into automatic savings/investment vehicles by taking a portion of each player's consideration (e.g., cost of a ticket) and instead of putting it at risk in the game, depositing it into a savings or investment account for long-term appreciation. Nu Lots offers the prospect of transforming the lottery and broader gaming industries, by embedding automatic saving/investment vehicles in all sorts of games. Nu Lots players would stand to gain significantly more from their automatic savings than they would put at risk by playing lotteries or other games of chance.

Now, returning to the first question, even without Nu Lots, a very large market exists for securitizing gambling risk. Current global gambling revenues exceed $150 billion per year, with $50 billion in lotteries alone. Securitization of gambling risk could help create a significantly larger industry, by allowing game operators to hedge their risk more effectively and for larger prizes. Securitization, if used to create portfolios that perform better in market crises, would offset potential negative consequences from increased gambling. Finally, if Nu Lots style games become the norm for the industry, the effects would be absolutely transformative. People who save and invest nothing would become automatic captalists, without having to give up their dreams of a big win. Games would emerge that even hardened rationalists would decide were worth playing, as the cost of positive skew became more reasonable.

TABLE ONE

Return to SCOREs Investor as a Function of Number of Super-Grand Prize Winners (on Notional $100 M)

| # of lottery drawings | wins | prob | return (millions) | exp ret | notional return | exp P&L |
|---|---|---|---|---|---|---|
| 100 | 0 | 36.60% | 100 | 36.60323 | 100% | $36,603,234.13 |
| 100 | 1 | 36.97% | 60 | 22.18378 | 60% | $22,183,778.26 |
| 100 | 2 | 18.49% | 20 | 3.697296 | 20% | $3,697,296.38 |
| 100 | 3 | 6.10% | −20 | −1.219983 | −20% | ($1,219,983.32) |
| 100 | 4 | 1.49% | −60 | −0.896503 | −60% | ($896,502.89) |
| 100 | 5 | 0.29% | −100 | −0.289779 | −100% | ($289,778.71) |
|  |  |  |  | Scenario Weighted P&L: |  | $60,078,043.84 |

In the above table, it can be seen that in more than 9 of 10 two year intervals, SCOREs are expected to return a positive gross P&L between 20% and 100%. The most likely loss scenario, in which 3 super-grand prizes are awarded during the two-year life of the contract, would be expected to happen to a given lottery less than once in 30 years. Four or more super grand-prize wins in a two-year period would be expected less than once in 100 years.

NOTE: It is possible to transfer risk of loss by creating tranched SCOREs. Development of a market in collateralized Gaming Obligations™ (CGOs™) should facilitate the creation of liquid market for SCOREs. Looking back at Table One, tranching of SCOREs would sub-divide risk and return amongst investors holding the tranched securities. For Example, two investors could divide the risk/return distribution as follows:

Investor A retains the the risk of 1 or 2 super-grand prize payouts over the term of the contract, transferring the risk the $3^{rd}$ or any higher number of payouts to Investor B. Investor B receives a portion (say 20%) of Investor A's premium, in consideration of the risk he is accepting. In this way, Investor A largely eliminates his risk of loss, while still earning a very nice return. Meanwhile, Investor B earns a very nice return by accepting the possibility of a significant loss that would not be expected to happen more than once in 30 years of play.

Alternatively, Investor A could retain the risk of up to 3 super-grand prize payouts over the term of the contract, transferring the risk the $4^{th}$ or any higher number of payouts to Investor B. Investor B receives a portion (say 10%) of Investor A's premium, in consideration of the risk he is accepting. In this way, Investor A limits his potential losses substantially, while still earning a very nice return. Meanwhile, Investor B earns a very nice return by accepting the possibility of a significant loss that would not be expected to happen even once in a hundred years of play.

Note that there is an extremely small probability of more than 5 super-grand prize wins. In a preferred embodiment, this would be handled by terminating the contract in the event that 5 super-grand prizes are awarded. This would be expected to happen less than once in 600 contract years. Of course, if 10 similar lotteries are operating in parallel, this type of tail event would happen more frequently.

BRIEF SUMMARY OF THE INVENTION

The present invention provides several new ways to produce uncorrelated returns and to increase the risk-adjusted return of a portfolio, or more generally, any collection of assets and/or liabilities ("CoA/Ls"). These include:
Collateralized Gaming Obligations ("CGOs");
FISCs;
TSFIs;
Virtual diversatives;
P2P FoFs; and
Programmable diversatives.

DETAILED DESCRIPTION OF THE PREFERRED EMBODIMENTS

1. The above-described (and incorporated by reference) invention provides a means to increase the risk-adjusted expected return of one or more portfolios by enabling one or more investors to purchase securities (or other financial instruments) a portion of whose cashflows are uncorrelated to financial market and/or economic variables.

2. Aside from its use to guarantee large prize payouts, the financial instrument described above has a valuable characteristic from the investor standpoint: returns on this instrument are likely to have a stable expected correlation to returns on ordinary financial instruments. By "expected correlation" we mean a forecast of future correlation of returns between two financial instruments, indexes, or benchmarks. This forecast may be derived from historical correlations and/or forecasting models.

3. Unstable correlations present great difficulties for investors and/or portfolio managers trying to construct an investment portfolio. Assets chosen for their apparent lack of correlation to each other in one market regime can suddenly become highly correlated (for example, during a period of market turbulence) to the detriment of investors and portfolio managers.

4. One of the values of SCOREs is that they may be constructed to minimize (perhaps even eliminate) the effects of market regime change on returns and correlations. For example, through margining and escrow arrangements, the game operator can be assured that the investor will be able to pay and that the payment is guaranteed through a financial institution with high credit quality.

5. Collateralized Gaming Obligations (CGOs). CGOs allow investor(s) to sell or otherwise transfer a part of the financial risk related to one or more games ("game risk") to other investor(s), whereby they might only have to pay up to a certain amount and/or a certain number of prizes during a certain period, with the extra risk absorbed by one or more third parties. Game risk may be divided into tranches, as is presently done with collateralized debt obligations ("CDO"s). Traditional cash CDOs issue securities against debt securities held as collateral and managed according to a strict set of rules known as an indenture. Synthetic CDOs replace the underlying securities with one or more derivatives contracts (e.g. credit default swaps (CDS), standardized CDS indexes, and customized "bespoke" indexes). Analogously, game risk can be bundled into what we shall call Collateralized Gaming Obligations ("CGO"s). Investors in CGOs would be indirect purchasers of one or more varieties of gaming risk. Synthetic CGOs could be tranched to allocate risk/reward more efficiently while preserving the salient characteristic of gaming risk: its independence from market regime.

6. Financial Instruments with Specific Correlation Characteristics ("FISCs"). While pure gaming risk offers stable expected correlation, some investors may wish to have specifiable correlation that varies in a predictable manner. This may be accomplished by creating custom derivative financial instruments with rules that constrain returns and realized correlation among specified assets. For example, a financial instrument may be composed of a SCOREs derivatives contract like the one described in paragraph (3), with the added characteristic that it embeds an option on some other financial instrument of interest to the investor. This has the effect of transforming the expected correlation under specific circumstances where such transformation if of value to the investor.

7. In a preferred embodiment, financial instruments are defined, created, and sold with correlation characteristics (expected and/or realized correlations) that vary as a function of a multiplicity of market regimes. For example, an instrument is defined to have at or near zero correlation to a given benchmark during market regime A and a correlation at or near minus one to that same benchmark during market regime B. This would be a 2-phase financial instrument with specific correlation characteristics ("$FISC_2$"). More generally, an n-phase financial instrument with specific correlation characteristics is referred to as "$FISC_n$". Such instruments, when implemented as derivatives (whether exchange-traded or over-the-counter) are examples of what I call "diversatives." Diversatives are derivatives that are designed to increase the value of one or more quantities correlated with the expected risk-adjusted return of one or more portfolios and or CoA/Ls. Diversatives may preferably be structured as financial swaps. In an alternative preferred embodiment, diversatives may be structured as swaptions. Other diversatives are described in U.S. Provisional Patent Application 60/634,491, filed Dec. 9, 2004.

8. Say that the benchmark is a broad market index (equity, fixed income, commodity, or other type). A $FISC_2$ instrument would specify means for periodically (e.g., quarterly, monthly, daily, hourly) determining the state of the market (either regime A or regime B); based on said determination the terms of the instrument would be used to calculate bidirectional cashflows and/or accruals between one or more holders of the instrument and one or more issuers and/or other counterparties (e.g., underwriters).

9. $FISC_2$ diversatives may be used to hedge against a risk that currently cannot be hedged against: phase locking risk. Phase locking refers to the sudden shift from mostly uncorrelated to the (nearly) full correlation exhibited by many financial instruments and hedge funds during periods of market crisis. For a discussion of phase locking and conditional correlation, see "Systemic Risk and Hedge Funds", a paper by Nicholas Chan, Mila Getmansky, Shane Haas, and Andrew Lo, dated Feb. 22, 2005, prepared for the NBER conference on the Risks to Financial Institutions.

10. For example, a $FISC_2$ diversative could combine a plain vanilla SCOREs contract with an embedded option linked to a change in market regime. In a preferred embodiment, the option would entitle its holder to receive cashflows equivalent to selling one or more financial instruments at a price associated with the previous market regime (e.g., last price before change of regime, highest price in preceding n months, average price of preceding n months, etc.)

11. In an alternative preferred embodiment, the change in market regime could convert the SCOREs random payout features into an option like the one described above, suspending the non-correlated (SCOREs) portion of the financial instrument and strengthening its negative correlation during the market crisis.

12. A $FISC_n$ diversative, with n>2, may preferably reconvert into a non-correlated type instrument after a second change in market regime. The number of flips between market regimes need not be predefined; rather, the term of the $FISC_n$ diversative may be set as a number of days, months, or years, or as a perpetual instrument (like a stock or British consol bond), and definitions of market regimes may be established such that the diversative may change as many times as the market regime shifts during the term of the diversative.

13. In general, investors can use FISCs to create derivative financial instruments with one or more of the following characteristics:
    a. Stable expected correlation
    b. Randomly varying expected correlation
    c. Algorithmically determined expected correlation
    d. Stable realized correlation
    e. Randomly varying realized correlation
    f. Algorithmically determined realized correlation
    g. Zero expected correlation
    h. Zero realized correlation 14. Time-shifted financial instruments ("TSFI's"). TSFIs increase risk-adjusted returns of portfolios by exchanging a current period return for
    a. Past actual returns over one or more time periods
    b. Future forecast returns over one or more time periods
    c. Future forecast returns that are adjusted as a function of actual realized returns
    d. Randomly generated mixtures of at least two of a,b,c
    e. Algorithmically determined mixtures of at least two of a,b,c An investor could agree to forego a first portion of his current year return on an index or other reference portfolio, in exchange for receiving a return equal to a second portion of a mutually agreed upon forecast return for the following year, to be adjusted in year two as actual monthly returns are realized. He might also agree to accept a third portion of current year returns next year in payment for giving up a fourth portion of next year's actual returns. For example, let the reference portfolio by the S&P 500 Index, and assume that all portions are halves. Assume further that current year returns turn out to be 20% (at end of current year=year 1) and that next year (year 2) returns are forecast to be 10% but turn out to be 8%. Then the investor who enters into this arrangement with a counterparty (whose characteristics are discussed below) receives $$(20\%+10\%)/2=15\%$$

for the first year, and $$(20\%+8\%--2\%)/2=13\%$$

for the second year.

Absent this transaction, he would have received 20% and 8%, which (neglecting transaction costs and the effects of compounding) is the same total return with a significantly higher variance.

Three questions spring to mind: who could and would want to be a counterparty to this transaction, what would transaction costs be, and what would be the effect of compounding on the economics of such "time swaps"?

The counterparty is the key. If there are natural counterparties to such transactions, then transaction costs are likely to be low. Compounding effects, while potentially large for volatile portfolios, are likely to balance out sometimes working to the benefit of the swapper, sometimes to his detriment. But is there a natural counterparty?

In fact there are many. Other investors, looking to devolatilise their portfolios, may contract with the first investor directly. Financial intermediaries may make a "book of time trades", getting compensating for making a market and for reducing overall market risk.

Explanatory note: TSFIs are distinct from futures contracts and forward contracts in at least the following ways:
- They are exchanging returns, not buying or selling an underlying commodity.
- They may reference historical returns and have no connection to future price levels
- They may blend historical, current, forecast future, and actual future returns in a myriad of ways.

15. Virtual diversatives and Peer to peer fund of funds ("P2P FoFs"). Diversatives provide alternative mechanisms to increase the risk-adjusted expected return, with or without linkage to gaming events per se, though the mechanisms may be modeled in a game-theoretic framework. (See Theory of Games and Economic Behavior, von Neumann and Morgenstern, 1944.) In what follows, methods and systems are disclosed through which one or more investors may swap cashflows defined by one or more metrics associated with one or more portfolios in order to increase the value of one or more quantities correlated with the risk-adjusted expected return of said portfolios. Said swaps may preferably be governed by documents modeled after existing derivative contracts such as are standardized by the International Swaps & Derivatives Association ("ISDA").

16. Definition: A financial swap is an exchange of payments between counterparties whose timing and other conditions are governed by a legal agreement called a "swap agreement". [See Swap Literacy by Elizabeth Ungar, Bloomberg Press, 1996.]

17. Additional definition: A swaption is an option to enter into swap. Payment of an option premium gives the buyer the right, but not the obligation, to enter into a specified swap agreement with the seller of the swaption.

18. As is known in the art, when assets that are uncorrelated to a given portfolio are added to said portfolio, said assets having an expected return greater than or equal to a first threshold value, , the resultant portfolio shows an increase in its risk-adjusted expected return. Said increase also results when uncorrelated assets with expected return greater than or equal to a second threshold value are acquired and substitute for more highly correlated assets whose expected return is not greater than a third threshold value. For these reasons, fund managers sometimes make investments in other funds whose correlation with their own fund or funds is sufficiently low, and whose expected returns are sufficiently high, to benefit from these effects. Indeed, funds of funds ("FoF"), a large and growing segment of the fund management business, are designed for investing in other funds. We will refer to these effects as "The Principle of Diversativity", distinguishing between the case where assets are added ("additive diversativity") and the case where assets are substituted ("substitutionary diversativity").

19. The Principle of Diversativity applies whether the underlying assets are primarily publicly traded securities, derivatives, securities of private companies, or any collection of assets and/or liabilities whose expected return and correlation to said portfolios may be estimated with sufficient accuracy.

20. Definition. A correlation manager ("CorMan", plural "Cormen") is any manager responsible for managing a Collection of Assets and/or Liabilities ("CoA/Ls"), who may use The Principle of Diversativity, implicity or explicitly, knowingly or unknowingly, to increase the expected risk-adjusted return of one or more CoA/Ls. Examples of Cormen include hedge fund managers, fund of hedge fund managers, mutual fund managers, other fund of fund managers, venture capital fund managers, private equity fund managers, separate account managers, commodity fund managers, corporate treasurers, other treasurers, and people responsible for managing at least a portion of one or more portfolios of assets and/or liabilities.

21. In contrast to current methods, the invention disclosed herein offers a more flexible mechanism for investors and Cormen of one or more investment portfolios and/or other CoA/Ls to increase the expected risk-adjusted return of said portfolios and/or other CoA/Ls. The invention improves upon existing financial swaps by defining a new group of derivative financial instruments that involve swap agreements containing metrics relating to the risk and return characteristics of one or more portfolios and/or CoA/Ls.

22. In a preferred embodiment, two Cormen can trade a diversative defined by an expected return metric. For example, Cormen A and B might agree to swap 50% of the expected returns of their respective portfolios for a certain time period (the swap's "tenor") and on certain dates ("swap payment dates"). Expected returns would be defined in the swap agreement. In a preferred embodiment, said definition would be negotiated by the Cormen. In an alternative preferred embodiment, said definition would be the responsibility of a neutral third party.

23. In an alternative preferred embodiment, two or more Cormen responsible for different subportfolios within the same CoA/L can trade a diversative as in the example above. This may preferably be done with internal swap rules similar to conventional ISDA type agreements, but carried out within the context of a single legal entity. These rules may be preferably linked to agreements (e.g., with investors and/or service providers) to make the rules legally binding. We call this type of intra-CoA/L diversative a "virtual diversative". Despite its name, it still has the real effect of increasing risk-adjusted expected return for the CoA/L in which it resides.

24. In a preferred embodiment, the definition of expected return could be expressed as an absolute return. In an alternative preferred embodiment, the definition could be expressed as a relative return, defined against a benchmark or other objectively verifiable phenomenon that might at defined intervals be used to programmatically recalculate the value of one or more metrics and the value of one or more quantities correlated with risk-adjusted expected return.

25. In another alternative preferred embodiment, three or more fund managers could swap expected returns amongst themselves, using diversatives to create what could be thought of as peer to peer funds of funds ("P2P FoFs"). P2P FoFs differ from ordinary FoFs in that they are managed by the actual fund managers, each of whom knows at least their own fund better than a traditional FoF manager. They also differ from single manager multi-strategy funds in that they are not limited to the funds of a single investment manager (and/or its affiliates). Finally, they differ from existing investments by (FoF and/or non-FoF) fund managers in third party funds in at least the following ways:
   a. they are not direct investments in the funds themselves, rather they are swaps of cashflows related to the performance of said funds.

b. Being swaps, they are governed by swap agreements that may preferably be standardized, and may be assignable or tradeable.
c. Unlike so-called "fee swaps", they preserve the alignment of interest of the fund managers and fund investors.
d. By eliminating the need to invest in the funds themselves, a layer of cost, fees, complexity, and operational risk is eliminated or at least reduced.
e. The metrics used to define these swaps may be customized to include negotiation methods, third party valuation methods, adjustments for risk, adjustments for ex post versus ex ante measurements, adjustments for other exogenous events.

26. For example, a multi-strategy fund wishing to add a new strategy without having to acquire all of the operational expertise associated with that strategy may acquire exposure to that strategy quickly and at significantly lower cost by entering into a diversative swap with a fund already successfully deploying that strategy. If the latter fund desires exposure one of the former fund's strategies, then each may achieve highly cost-effective increases to their respective risk-adjusted returns, delivering a competitive advantage to both funds against similar funds who do not enter into a similar swap agreement.

27. Similarly, a corporation desiring to add exposure to a particular line of business may enter into a diversative swap with a corporation or other entity already engaged in that business. Swap terms may reference the performance of one or more operating entities, business units, subsidiaries, or the equivalent. Said swaps may be highly effective, customizable means to achieve a desired exposure to particular businesses without the time, cost, and risk associated with mergers and acquisitions.

28. Programmable diversatives. U.S. nonprovisional patent application Ser. No. 10/733,482, filed Dec. 11, 2003, describes financial instruments embodied in or represented by computer programs. In an alternative preferred embodiment, diversatives may be embodied or represented by said computer programs. Said programs may be web agents, that travel over the internet interacting with other similar programs. U.S. nonprovisional patent application Ser. No. 10/733,482 discloses methods and systems for creating and managing programmable financial instruments. Programmable diversatives may be used to facilitate real-time risk management of funds.

29. A preferred method for creating diversatives structured as financial swaps or swaptions comprises:
a. selection of one or more counterparties;
b. selection of one or more portfolios or other CoA/Ls;
c. selection of one or more metrics (see examples below);
d. execution of a swap (and/or swaption) agreement using said metrics with said CoA/Ls and said counterparties;
e. determination of the value of said metrics;
f. determination of the value of one or more quantities correlated with the risk-adjusted expected return of said CoA/Ls;
g. calculation of cashflows to be paid and received according to the values of the metric(s) and the terms of the agreement;
h. exchange of cashflows according to the terms of the agreement; and
i. assignment, partial assignment, or unwinding of the agreement.

30. Metrics for Diversative Swap Agreements may preferably include calculations involving:
a. Expected return
b. Ex Ante Alpha
c. Ex Post Alpha
d. Ex Ante Beta
e. Ex Post Beta
f. Historical Correlation Coefficient
g. Implied Correlation
h. Historical Volatility
i. Implied Volatility
j. Historical Skewness of Returns
k. Historical Kurtosis of Returns
l. Forecast Skewness of Returns
m. Forecast Kurtosis of Returns 31. In a preferred embodiment, one or more databases containing information about assets, liabilities, and correlations may be searched by web agents and/or other programs to identify potential diversative trades, notifying potential counterparties (preferably in real-time) about the existence of beneficial trades, and facilitating said trades, preferably through real-time electronic means.

32. While the invention has been described in conjunction with specific embodiments, it is evident that numerous alternatives, modifications, and variations will be apparent to those skilled in the art in light of the foregoing description.

I claim:

1. A method for using a computer for diversative financial instruments, wherein the computer is programmed to perform the following operations:
   (a) accessing, using the computer, one or more databases stored in computer readable memory operatively connected to the computer, containing:
      (1) asset information,
      (2) liability information,
      (3) counterparty information,
      (4) metric information, and
      (5) swap agreement information;
   (b) receiving, using the computer, first swap agreement information including:
      (1) first counter party information identifying a plurality of counterparties to the first swap agreement,
      (2) first option information identifying a first option to be applied against at least one of first asset information and first liability information contingent upon a first regime, and
      (3) first metric information comprising a future cash flow that is at least partially determined by one or more events associated with playing one or more games;
   (c) executing, using the computer, said first swap agreement;
   (d) updating, using the computer, the one or more databases with the first counterparty information, first option information and first metric information;
   (e) determining, using the computer, a first metric value for the first metric information;
   (f) determining, using the computer, a first risk adjusted expected return value for the first option, based at least in part on the first option information;
   (g) calculating, using the computer, first cashflows value to be paid and/or received according to the determined first metric value and determined first risk adjusted expected return value;
   (h) sending, using the computer, the calculated first cashflows values to be exchanged; and
   (i) updating the one or more databases, with the first metric value, the first risk adjusted expected return value and the first cashflows value.

* * * * *